US008156368B2

(12) United States Patent
Chambliss et al.

(10) Patent No.: US 8,156,368 B2
(45) Date of Patent: Apr. 10, 2012

(54) REBUILDING LOST DATA IN A DISTRIBUTED REDUNDANCY DATA STORAGE SYSTEM

(75) Inventors: David D. Chambliss, Morgan Hill, CA (US); James L. Hafner, San Jose, CA (US); Tarun Thakur, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/710,101

(22) Filed: Feb. 22, 2010

(65) Prior Publication Data

US 2011/0208994 A1 Aug. 25, 2011

(51) Int. Cl.
*G06F 11/00* (2006.01)
(52) U.S. Cl. ........ 714/6.24; 711/162; 714/4.3; 714/6.22
(58) Field of Classification Search .................. 714/4.3, 714/6.22, 6.24; 711/162
See application file for complete search history.

(56) References Cited

U.S. PATENT DOCUMENTS

| | | | |
|---|---|---|---|
| 4,916,605 A | 4/1990 | Beardsley et al. | |
| 5,388,108 A | 2/1995 | DeMoss et al. | |
| 5,627,990 A | 5/1997 | Cord et al. | |
| 5,720,025 A | 2/1998 | Wilkes et al. | |
| 6,223,323 B1 | 4/2001 | Wescott | |
| 6,298,415 B1 | 10/2001 | Riedle | |
| 6,353,895 B1 * | 3/2002 | Stephenson | 714/5.11 |
| 6,427,212 B1 * | 7/2002 | Frey, Jr. | 714/6.24 |
| 6,446,220 B1 | 9/2002 | Menon | |
| 6,446,237 B1 * | 9/2002 | Menon | 714/800 |

(Continued)

FOREIGN PATENT DOCUMENTS

EP 0 594 464 A2 4/1994

(Continued)

OTHER PUBLICATIONS

Crews, C.V., et al., "Parity Preservation for Redundant Array of Independent Direct Access Storage Device Data Los Minimization and Repair," IBM Technical Disclosure Bulletin, Mar. 1, 1993, pp. 473-478, v. 36, No. 3, United States.

(Continued)

*Primary Examiner* — Robert Beausoliel, Jr.
*Assistant Examiner* — Joshua P Lottich
(74) *Attorney, Agent, or Firm* — Kenneth L. Sherman, Esq.; Michael Zarrabian, Esq.; Myers Andras Sherman & Zarrabian LLP

(57) ABSTRACT

Rebuilding lost data in a distributed redundancy data storage system including multiple nodes, is provided. User data is stored as a collection of stripes, each stripe comprising a collection of data strips and associated parity strips, the stripes distributed across multiple corresponding data owner nodes and multiple corresponding parity owner nodes. A data owner node maintains the associated data strip holding a first copy of data, and a parity owner node maintains a parity strip holding a parity for the collection of data strips. Upon detecting a failure condition, the owner node initiates a rebuilding protocol for recovery of lost data and/or parity it owns. The protocol includes reconstruction of lost data or parity by a computation involving data and/or parity from a recovery strip set in a stripe, wherein a recovery strip set contains at least one surviving data or parity strip. The recovery strip set for a lost data strip contains at least one surviving parity strip.

23 Claims, 10 Drawing Sheets

U.S. PATENT DOCUMENTS

| | | | |
|---|---|---|---|
| 6,542,960 | B1 | 4/2003 | Wong et al. |
| 6,553,511 | B1 | 4/2003 | DeKoning et al. |
| 6,718,444 | B1 | 4/2004 | Hughes |
| 6,725,392 | B1* | 4/2004 | Frey et al. ............ 714/6.12 |
| 6,732,290 | B1 | 5/2004 | Perry et al. |
| 6,898,668 | B2 | 5/2005 | Thompson et al. |
| 6,950,901 | B2* | 9/2005 | Chiu et al. ............ 711/114 |
| 6,970,987 | B1 | 11/2005 | Ji et al. |
| 6,983,396 | B2 | 1/2006 | Brant et al. |
| 6,993,676 | B2 | 1/2006 | Corbin et al. |
| 7,093,157 | B2 | 8/2006 | Hajji |
| 7,149,847 | B2* | 12/2006 | Frey et al. ............ 711/114 |
| 7,206,991 | B2 | 4/2007 | Chatterjee et al. |
| 7,386,757 | B2 | 6/2008 | Lindenstruth et al. |
| 7,516,354 | B2 | 4/2009 | Nguyen et al. |
| 7,529,970 | B2 | 5/2009 | Hartline et al. |
| 2002/0091897 | A1 | 7/2002 | Chiu et al. |
| 2003/0225899 | A1* | 12/2003 | Murphy ............ 709/230 |
| 2004/0093464 | A1 | 5/2004 | Hassner et al. |
| 2004/0128587 | A1* | 7/2004 | Kenchammana-Hosekote et al. ............ 714/43 |
| 2005/0050267 | A1 | 3/2005 | Yamamoto et al. |
| 2006/0112302 | A1 | 5/2006 | Cherian |
| 2006/0161805 | A1 | 7/2006 | Tseng et al. |
| 2007/0028145 | A1 | 2/2007 | Gerhard et al. |
| 2007/0067677 | A1 | 3/2007 | Weiberle et al. |
| 2007/0180299 | A1* | 8/2007 | Kim et al. ............ 714/6 |
| 2008/0040553 | A1 | 2/2008 | Ash et al. |
| 2008/0109616 | A1 | 5/2008 | Taylor |
| 2009/0157958 | A1 | 6/2009 | Maroney et al. |
| 2010/0180153 | A1* | 7/2010 | Jernigan et al. ............ 714/6 |

FOREIGN PATENT DOCUMENTS

| | | |
|---|---|---|
| JP | 7-152499 | 6/1995 |
| JP | 2006252414 A | 9/2006 |

OTHER PUBLICATIONS

Hafner, "WEAVER Codes: Highly Fault Tolerant Erasure Codes for Storage Systems," Fast '05: 4th USENIX Conference on File and Storage Technologies, Dec. 2005, pp. 211-224, published at http://www.usenix.org/events/fast05/tech/full_papers/hafner_weaver/hafner_weaver.pdf, United States.

Solsie.com, "IBM Acquired XIV Nextra: Targeting Web 2.0 Storage Need," Jan. 11, 2008, downloaded at http://solsie.com/2008/01/ibm-acquired-xiv-nextra-targeting-web-20-storage-need/, 7 pages, United States.

International Search Report and Written Opinion mailed Mar. 22, 2011 for International Application No. PCT/EP2011/052572 from European Patent Office, pp. 1-12, Rijswijk, The Netherlands.

Mourad, A.N. et al., "Recovery Issues in Databases Using Redundant Disk Arrays," Journal of Parallel and Disbtributed Computing, vol. 17, No. 1, Elsevier, Jan. 1, 1993, pp. 75-89, Amsterdam, The Netherlands.

U.S. Non-Final Office Action for U.S. Appl. No. 12/710,123 (IBM2.PAU.35) mailed Apr. 12, 2011.

U.S. Non-Final Office Action for U.S. Appl. No. 12/710,162 (IBM2.PAU.37) mailed Apr. 15, 2011.

* cited by examiner

REBUILDING LOST DATA IN A DISTRIBUTED REDUNDANCY DATA STORAGE SYSTEM

BACKGROUND

1. Field of the Invention

The invention relates generally to maintaining data recovery. In particular, the present invention relates to data recovery in a distributed redundancy data storage system.

2. Background

In information technology (IT) systems, often data is stored on storage devices with redundancy to protect against component failures resulting in loss of data. Such data redundancy can be provided by simple data mirroring techniques or via erasure coding techniques. Erasure codes are the means by which storage systems are made reliable. In erasure coding, data redundancy is enabled by computing functions of user data such as parity (exclusive OR) or other more complex functions such as Reed-Solomon encoding. A Redundant Array of Inexpensive Disks (RAID) stripe configuration effectively groups capacity from all but one of the disk drives in a disk array and writes the parity (XOR) of that capacity on the remaining disk drive (or across multiple drives). When there is a failure, the data located on the failed drive is recovered by reconstruction using data from the remaining drives.

In monolithic systems (e.g., a controller with two redundant processors where all the storage disks are accessible to both processors), data reconstruction can be more easily managed by one of the processors with a full knowledge of events during the process. Recovery from error or interruption is simplified. However, in a distributed redundancy data storage system including a collection of loosely coupled processing nodes that do not share the same disks, there are many more components, less shared knowledge and many more failure states and events. "Distributed" means that it is a collection of nodes. "Redundant" means that it must have erasure coding.

Most distributed storage systems perform recovery by a centrally designated node, or at a host device or client device. Recovery at a host or client enables recovery and coordination in a manner similar to the centralized approach. Such approaches do not leverage fully the processing power of all the nodes.

BRIEF SUMMARY

Rebuilding lost data in a distributed redundancy data storage system including multiple nodes, is provided. User data is stored as collection of stripes, each stripe comprising a collection of data strips and associated parity strips, the stripes distributed across multiple corresponding data owner nodes and multiple corresponding parity owner nodes. For each stripe, data owner node maintains the associated data strip holding a first copy of data, and a parity owner node maintains a parity strip holding a parity for the collection of data strips, wherein parity coherency is maintained.

Upon detecting a failure condition, the owner node initiates a rebuilding protocol for recovery of lost data and/or parity it owns. The protocol includes reconstruction of lost data or parity by a computation involving data and/or parity from a recovery strip set in a stripe, wherein a recovery strip set contains at least one surviving data or parity strip. The recovery strip set for a lost data strip contains at least one surviving parity strip.

Another embodiment comprises a distributed data storage system, comprising multiple nodes configured for storing information as a set of stripes, each stripe including a collection of data strips and associated parity strips, the stripes distributed across corresponding data owner nodes and corresponding parity owner nodes. Each data owner node for each data strip is configured for maintaining the data strip holding a first copy of data, and each parity node is configured for maintaining a parity strip holding a parity for the collection of data strips, wherein parity coherency is maintained.

Upon detecting a failure condition, a data or parity owner node initiates a rebuilding protocol for recovery of lost information including at least one of: a data strip or a parity strip, from a recovery strip set in a stripe, wherein a recovery strip set for a lost data strip contains at least one corresponding parity strip, and the recovery strip set may contain a corresponding parity strip for a lost parity strip.

Another embodiment comprises a computer program product for recovering data in a distributed redundancy data storage system including multiple nodes, the computer program product comprising a computer readable medium having a computer usable program code embodied therewith. The computer usable program code comprises computer usable program code configured to store information as a set of stripes, each stripe including a collection of data strips and associated parity strips, the stripes distributed across corresponding data owner nodes and corresponding parity owner nodes. The computer usable program code further comprises computer usable program code configured to maintain a data strip holding a first copy of data, and to maintain a corresponding parity strip holding a parity for the collection of data strips, wherein parity coherency is maintained.

The computer usable program code further comprises computer usable program code configured to, upon detecting a failure condition, initiate a rebuilding protocol for recovery of lost information including at least one of: a data strip or a parity strip, from a recovery strip set in a stripe, wherein a recovery strip set for a lost data strip contains at least one corresponding parity strip, and the recovery strip set may contain a corresponding parity strip for a lost parity strip.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments providing data redundancy and recovery in information technology (IT) systems. While the following description will be described in terms of such systems for clarity and placing the invention in context, it should be kept in mind that the teachings herein may have broad application to all types of systems, devices and applications.

Rebuilding lost data in a distributed redundancy data storage system is provided. One embodiment comprises performing data or parity rebuild on a distributed redundancy data storage system employing a owner-driven rebuild protocol, disclosed herein. A distributed redundancy data storage system may rebuild lost data in a fully distributed manner while maintaining the system design aspect of simplicity.

Figure 1:
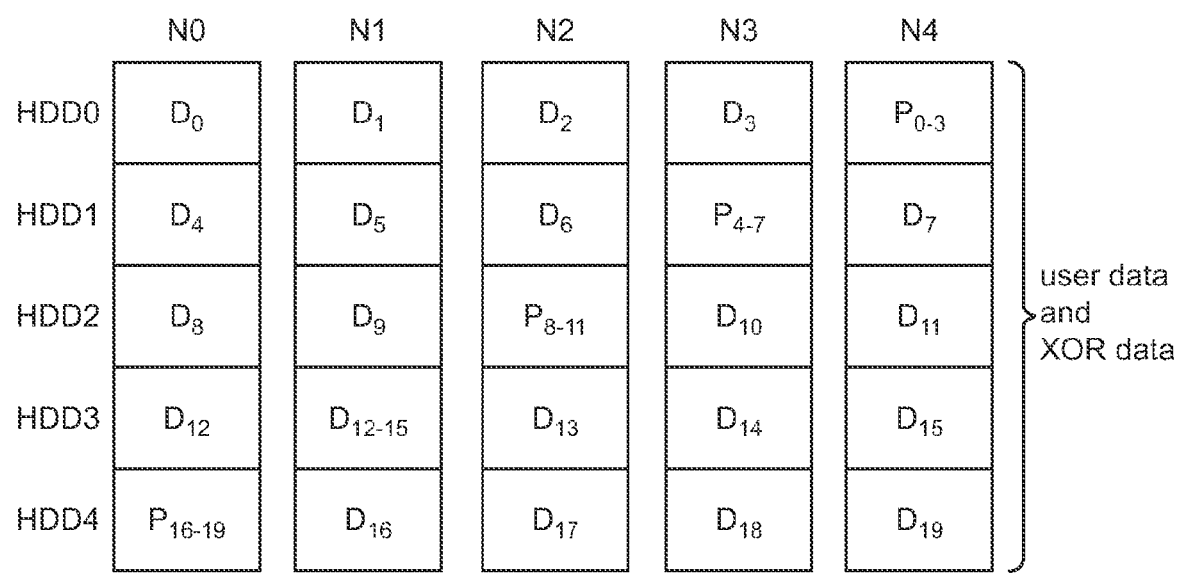
FIG. 1 shows an example distributed redundancy storage system.

The following terminology is provided to help in understanding the description further below.

node a computer and disk enclosure with a distributed redundancy module, processor, memory, disks, power supply, etc., in a data storage system.

owner node a node that is responsible for maintaining accessibility of a data or parity strip in a stripe.

data node a node that holds a first copy of host data (this is the data owner).

user data data written by a host or client to a storage system for possible later retrieval.

parity data redundancy calculated by a scheme to recover lost user data.

strip a chunk (block) of user data or parity.

stripe a collection of data strips and parity strips that are connected by parity calculations (an example is shown in FIG. 1 described further below).

parity node a node that holds one of the parity strips for a collection of data strips in a stripe (this is the parity owner).

delegate a node requested to do work on behalf of another node.

recovery strips data and/or parity strips needed to recover a specific lost data or parity strip (from the same stripe).

parity lock node a parity node selected to hold a lock on its parity to prevent update or changes to the parity as part of the rebuild protocol.

User data is stored as collection of stripes, each stripe comprising a collection of data strips and associated parity strips, distributed across multiple corresponding data owner nodes (primary nodes) and multiple corresponding parity owner nodes. For each stripe, a corresponding data owner node maintains the associated data strip holding a first copy of data, and a parity owner node maintains a parity strip holding a parity for the collection of data strips, wherein parity coherency is maintained. Preferably, each parity calculated based on a different parity calculation formula. In an example stripe, n+1 nodes are required to store the data of n independent nodes.

FIG. 1 shows a distributed redundancy storage system stripe configuration with an array of nodes (i.e., N0, ..., N4), each node having multiple disk drives (i.e., HDD0, ..., HDD4), effectively groups capacity from all but one of the nodes and writes the parity P (e.g., XOR) of that capacity on remaining nodes or across multiple nodes (as shown). For example, the data strips $D_0, \ldots, D_3$ in HDD0 of nodes N0, ..., N3, respectively, are for user data, and a parity strip $P_{0-3}$ in HDD0 of node N4 is for corresponding parity data (e.g., XOR of $D_0, \ldots, D_3$). The data strips $D_0, \ldots, D_3$ and parity strip $P_{0-3}$ form a stripe. Spreading the parity data across the nodes as shown allows spreading the task of reading the parity data over several nodes as opposed to just one node. Writing on a node in a stripe configuration requires that one or more new parities be calculated for this new data and the new parities be written over the old parities in each of the nodes holding a parity. The mechanism by which the parities are maintained consistent with the data is outside the scope of this invention. To help in understanding the description herein, note that each node is responsible for maintaining a copy of the data and/or parity it owns. To this effect, each node generally acts independently of other nodes in initiating any rebuild or reconstruction of any lost data and/or parity for which it is the owner. If a node fails, one or more new nodes may be designated as the new owner of some or all of the data lost on the failed node. In such cases, the new owner is responsible for initiating or driving the reconstruction of the lost data and/or parity it now owns. There is no restriction that information on a disk be only data or only parity. Other embodiments may have disks within a node containing data for one stripe and parity data for another stripe.

An embodiment of the rebuild protocol is implemented from the perspective of a data or parity strip owner node. Generally, each node that owns a data or parity strip is responsible for driving the recovery of its data strip or parity strip from a recovery strip set in the stripe. This is in contrast with a system in which one node is responsible for recovery either on a global level or on a per stripe basis. As provided herein, each owner node acts generally independently of other owner nodes, even of the same stripe, in initiating its rebuild protocol. Thus, less overall explicit coordination (and, thus less complexity) between nodes of the same stripe is needed, even when there are more than two rebuilds that need to occur simultaneously.

Depending on failure state (combinations of strip losses in a stripe) and the erasure code, a given lost data strip or parity strip, may have one or more recovery strip sets. Furthermore, the recovery strip set for a lost data strip must contain at least one corresponding parity strip. If no data strips are lost, a parity strip recovery strip set contains only the data strips used to compute that parity value. A recovery strip set may be over-determined, that is, it may contain more than the mathematically minimal set of strips from the stripe needed to recover the lost data or parity.

Figure 2:
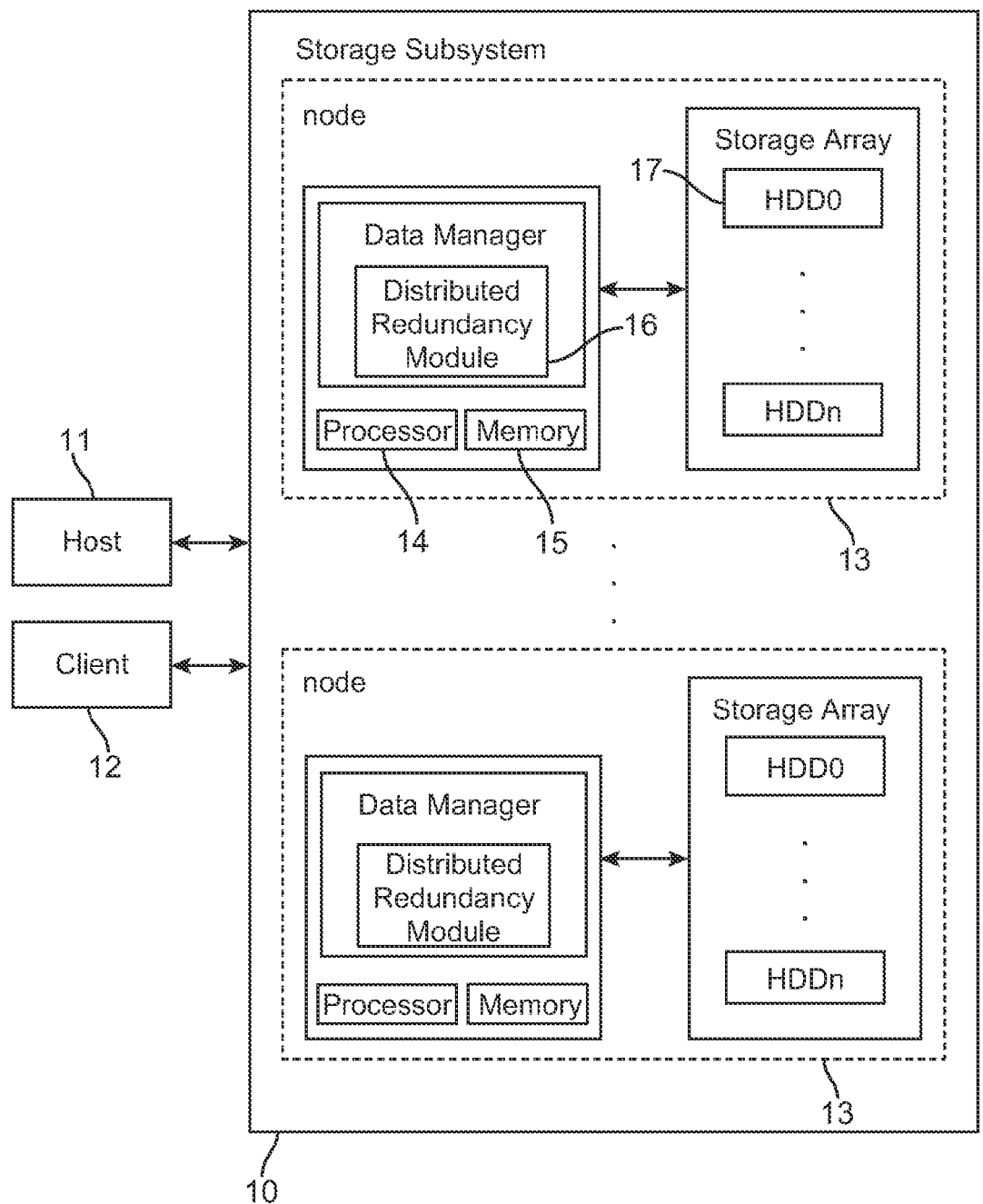
FIG. 2 shows a block diagram of a system for parity update protocol and rebuild protocol in a distributed redundancy data storage system.

FIG. 2 shows a distributed redundancy data storage system 10 that implements a owner-driven rebuild protocol, according to an embodiment of the invention. The system 10 is utilized for storing data from a host system 11 and/or a client system 12. The system 10 includes multiple nodes 13. Each node comprises a processor 14, memory 15, a data manager including a distributed redundancy module 16, and an array of storage devices such as hard disk drives 17 (e.g., HDD0, ..., HDDn). In one implementation, the distributed redundancy module 16 comprises program code for execution by the processor. In another implementation, the distributed redundancy module comprises firmware.

The distributed redundancy module 16 in each node implements a rebuild protocol for maintaining the accessibility of the data or parity in the data storage system 10. Data or parity strip rebuild is performed in system 10 such that each node 13 that owns a data strip or parity strip is responsible for driving the recovery and accessibility of that data or parity strip. This is different from a data storage system in which one node is responsible for recovery on a global level or on a per stripe basis. According to the rebuild protocol, since each owner node generally acts independently of other owner nodes in maintaining accessibility of the data or parity it owns, the overall explicit coordination between nodes of the same stripe is reduced, and coordination is performed by less explicit means, such as protocol serialization (described further below).

For the example implementations described herein, the distributed redundancy storage system 10 (FIG. 2) is fault tolerant to two storage device failures (either disk or node). Those skilled in the art recognize that generalization to higher fault tolerance is within the scope of the invention. Each data strip is encoded into two parity strips. This is extendible to more than two parity strips for higher fault tolerant systems. The owner-driven rebuild protocol enables a data node 13 to maintain accessibility to a copy of the data or parity it owns. The owner-driven rebuild protocol is owner-driven since it is initiated by an owner node itself. The rebuild protocol is implemented in each of the nodes 13 in FIG. 2. Each node 13 serves a data owner node for certain data, and serves as a parity owner node for certain parity (not from the same stripe as any data it owns), each node being capable of performing each of the functions of the protocol (owner, parity lock, delegate, etc.).

Further, according to the owner-driven rebuild protocol, each node that owns a data or parity strip is responsible for driving the recovery (rebuild) of its data or parity from a recovery strip set in the stripe. When a node or disk fails, spare capacity distributed throughout the system is used as locations for recovering or rebuilding lost data or parity, usually in units of strips. As such, the role of data owner node for a lost data strip can switch from one node to another. When this occurs, the new data owner node is responsible for driving reconstruction (rebuilding) of the data strip for which it is now the new owner. The same occurs for lost parity strips wherein the new owner drives the rebuilding of the parity for which it is now responsible.

The rebuilding protocol employs locking the strips in a recovery strip set from changes (by either host I/O or by parity update protocol in a system using fast write or write back). The rebuild protocol is initiated by the owner node (hence the name "owner-driven") to the parity lock node. The parity lock node is chosen in such a way that a lock granted by this one parity node is sufficient to lock all the strips in the recovery strip set from parity update during the rebuild protocol. For a lost data strip, this parity lock node is a node that holds a parity strip in the recovery strip set. This assures consistency and correctness for the reconstructed data. The rebuilding protocol involves three phases: a lock phase (which may include a data request), a gather plus compute phase, and an unlock phase. The owner-driven rebuild protocol for lost parity is similar to that for lost data, wherein a "parity lock node" for a parity owner node is the parity owner node itself. The differences are discussed in more detail below.

For certain erasure codes, an owner node is owner for both data strips and parity strips of the same stripe (e.g., in the Weaver code example described in detail below). In other erasure codes, an owner node is owner for only a data strip or a parity strip (exclusively, e.g., in the RAID6 code example described in detail below). The description below details the case where an owner node is responsible for only a data strip in a stripe. The variation for an owner node that is responsible for only a parity strip in a stripe is discussed separately below. The case where an owner node is responsible for both data and parity in the same stripe is exemplified by the detailed description for the Weaver code example given below (the more general case can be readily determined by one skilled in the art).

Two example implementations of the owner-driven rebuilding protocol are "@home version" and "delegate version". In the "@home version" of the rebuilding protocol, all strips in the recovery strip set are pulled to the owner node and computations are performed locally at that node to recover the lost data and/or parity. In the "delegate version" of the rebuilding protocol, the owner node requests the services of a delegate node to perform functions required to return the rebuilt data and/or parity to the owner node. As such, in the "delegate version", the owner node offloads the work to another node for the processing required to rebuild said data and/or parity and return the result to the owner node. Employing the delegate may reduce overall system resources when two or more strips need to be rebuilt in the same stripe. Typically, a delegate node is the owner of one of the parity strips in the recovery set for the lost data or parity.

Figure 3A:
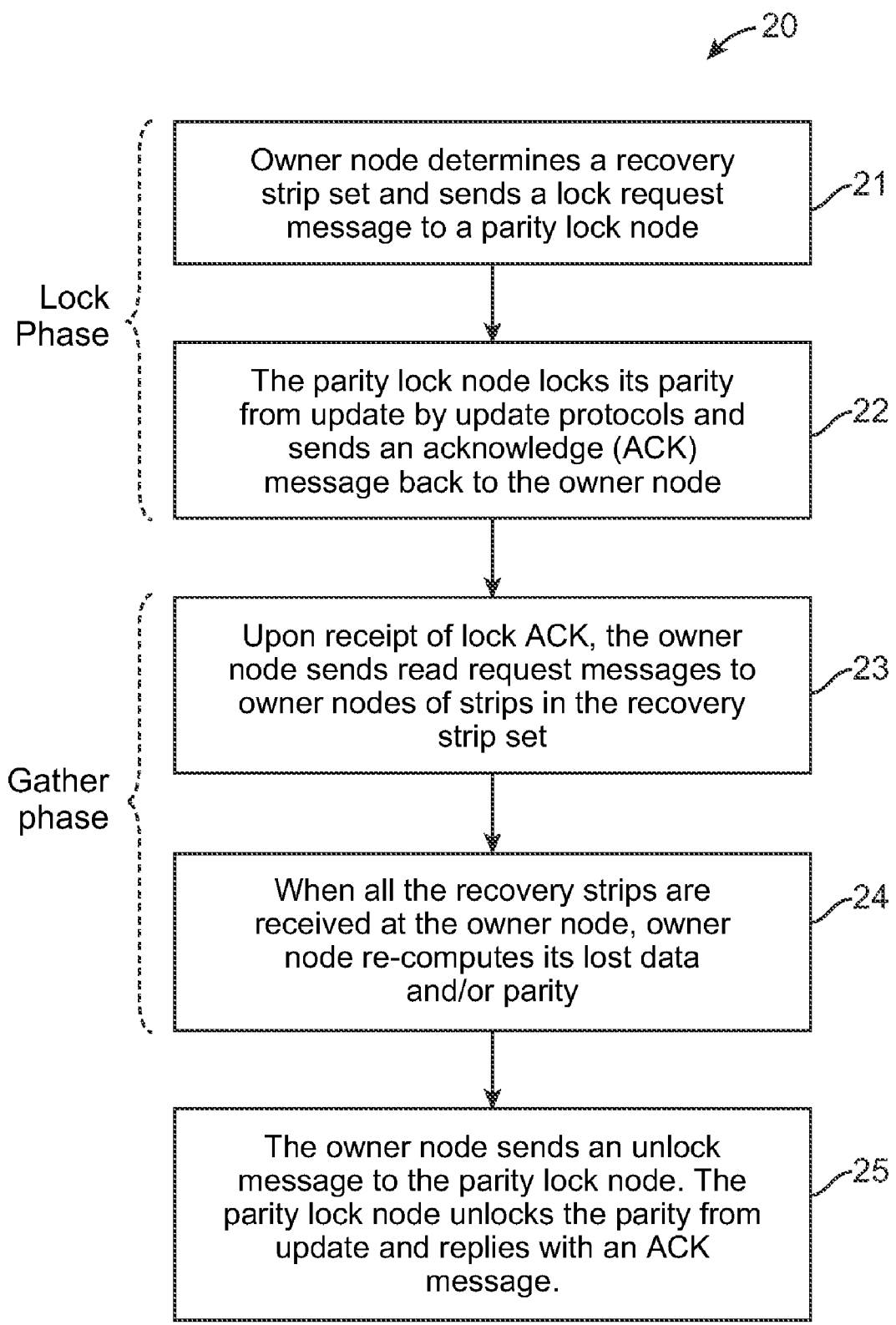
FIG. 3A shows a flowchart of a rebuild protocol process for reconstructing data in a distributed redundancy data storage system.

FIG. 3A shows a flowchart of a process 20 implementing an embodiment of the "@home version" variation of the rebuild protocol for lost data (as mentioned the lost parity variation is discussed below) comprising:

Block 21: In the lock phase, the data owner node determines a recovery strip set and sends a lock request message to a selected node, its "parity lock node". Along with this request may be a read request for a parity strip value.

Block 22: The selected parity lock node locks its parity from update by update protocols and sends a lock acknowledge (ACK) message back to the data owner node (with parity payload, if requested). This step marks the end of the "lock phase".

Block 23: In a gather phase, on receipt of the lock ACK, the owner data node sends read request messages to the owner nodes of each strip in the recovery strip set, excluding the parity lock node in case the read request was sent in the lock message in Block 21. These recovery strips are stable during this phase because the related parity is locked from change.

Block 24: When all the recovery strips are received at the data owner node, it re-computes its lost data. If the recovery strip set is over-determined, the data owner may be able to recompute its lost data prior to receiving all the recovery strips. In this case, any strips received after the recomputation of lost data are discarded. This step marks the end of the "gather plus compute phase".

Block 25: Finally, the data owner node sends an unlock message to the selected parity lock node. The selected parity lock node unlocks the parity from update and replies with an unlock ACK message. This completes the "@home rebuild protocol".

The message communication may be via a communication line, host, bus connecting the nodes, etc., implementing a message forwarding protocol.

Figure 3B:
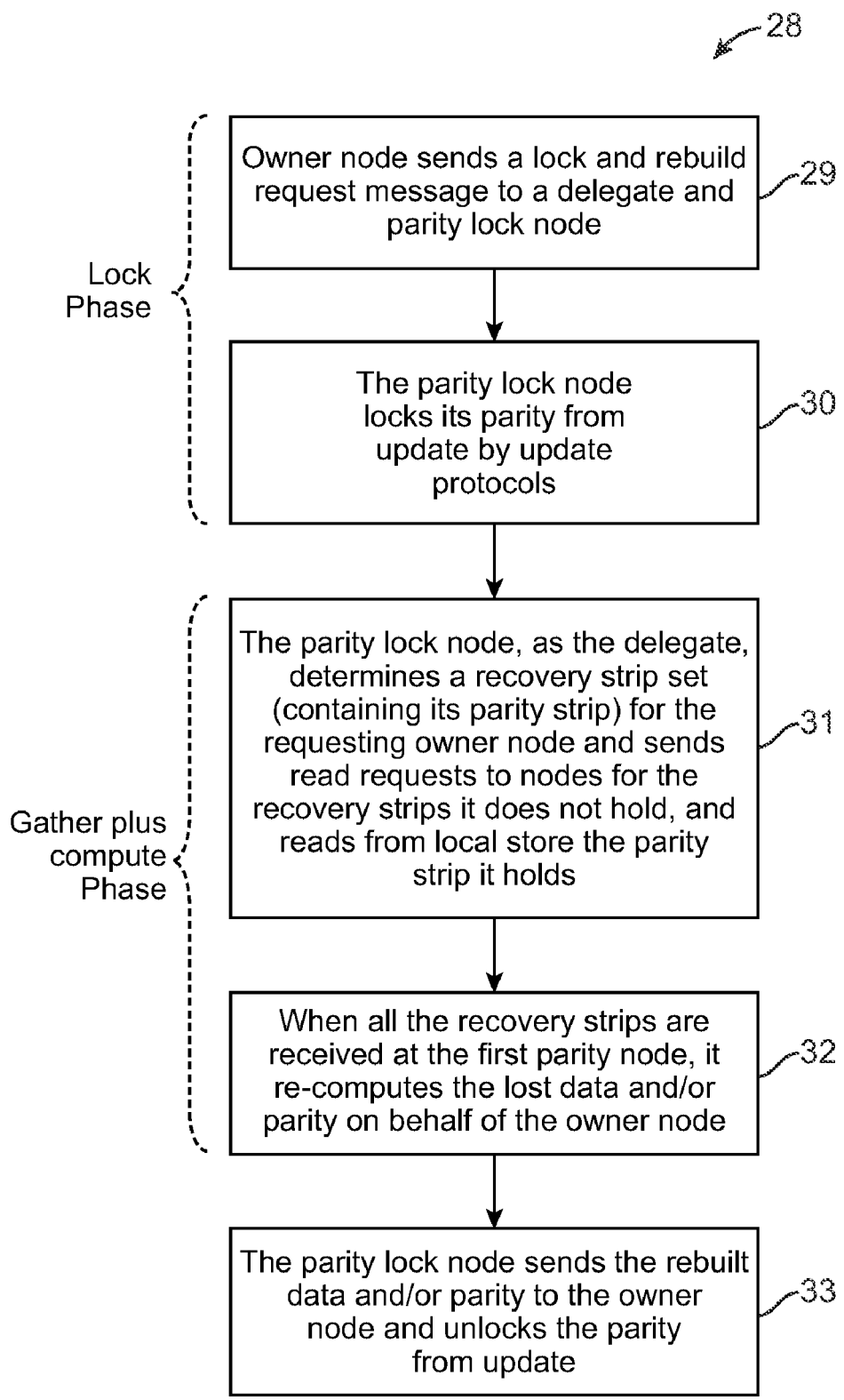
FIG. 3B shows a flowchart of another rebuild protocol process for reconstructing data in a distributed redundancy data storage system.

FIG. 3B shows a flowchart of a process 28 implementing an embodiment of the "delegate version" variation of the rebuild protocol comprising:

Block 29: In the lock phase, the data owner node sends a rebuild and lock request to a selected delegate node, which also plays the role of the parity lock node.

Block 30: The selected delegate/parity lock node locks its parity from update by update protocols (no ACK is needed since the parity lock node does all the work). This step marks the ends of the "lock phase".

Block 31: In a "gather plus compute phase", the delegate node then determines a recovery strip set (containing its parity strip) for the requesting owner node's data and sends read request messages to other nodes for the recovery strips it does not hold, and the delegate node reads from local store the parity strip it holds.

Block 32: When all the recovery strips are received at the delegate node, the delegate node re-computes the lost data on behalf of the data owner node. If the recovery strip set is over-determined, the delegate node may be able to recompute the lost data prior to receiving all the recovery strips. In this case, any strips received after the recomputation of lost data are discarded. This step marks the completion of the "gather plus compute phase".

Block 33: Finally, the delegate node sends the rebuilt data to the data owner node and unlocks the parity from update. The rebuilt data received at the data owner implicitly carries a successful ACK message. This completes the end of the "delegate version" of the rebuild protocol.

Parity Strip Rebuild

When only a parity strip needs to be rebuilt at the owner node, the "@home" variation of the protocol is simplified essentially because this node is its own "parity lock node". The step of sending a lock request (or unlock request) to the parity lock node is accomplished by autonomously setting (or releasing) the lock on its parity strip. Alternatively, it can select any another parity node, if it exists, that owns a parity strip in the recovery set as the parity lock node and implement the protocol exactly as if it were a data owner node. The steps for "gather plus compute" phase are the same as in the "@home" description above. In the "delegate version", the parity owner node again establishes its lock autonomously. It can select any other node that holds a recovery strip (either data or parity) as a delegate for the gather and compute phase (the delegate is not required to manage any locking) Alternatively, the parity owner node can implement the "delegate version" analogous to a data owner node, selecting, if it exists, a parity node that owns a strip in the recovery set and select that node as delegate and parity lock node.

Node Failures

There are two cases to consider if a node holding recovery strips (and participating in the rebuild protocol) fails during the "gather plus compute" phase (e.g., it cannot or does not provide the requested recovery strip) of the rebuild protocol. If the fault tolerance of the stripe has not been exceeded, the protocol should fail with an error and restart with a new recovery strip set. In some cases, it may continue if the recovery strip set is over-determined. If the fault tolerance has been exceeded, then the rebuild protocol fails with an error and data loss occurs. This is unavoidable. If the owner node fails during the rebuild protocol, the parity lock node releases its lock in the case of "@home version" (and, in the case of the "delegate version", halts the gather plus compute phase). A newly assigned owner node can restart the protocol afresh. If the parity lock node fails during the rebuild protocol, the lock is implicitly released and the owner node can restart the protocol with a second recovery strip set and new parity lock node (which takes on the role of delegate, in the "delegate version").

Interaction with Other Protocols

For correctness (i.e., to restore data and parity to the version consistent with user data written by a host or client) the rebuild protocol uses parity and data values that are consistent with the parity formulas. Updates to some data and associated parity while a rebuild is in progress may lead to an incorrect state. Consequently, the rebuild protocol must both prevent data/parity updates during the rebuild protocol and no rebuild protocol should run while a data/parity update protocol is in progress.

By locking the parity in the parity lock node, the rebuild protocol effectively and easily locks out the entire set of recovery strips from update. If a data strip had a parity formula relationship with the parity strip, then that data strip must be in the recovery strip set tied through the parity strip to the lost data, that data strip cannot be updated coherently without a corresponding update to the locked parity strip. Similarly, parity strips in the recovery strip set are also locked from update because their update must also involve the locked parity strip (or else they would not be in the recovery strip set). On the other hand, if a data/parity update protocol is in progress at the parity lock node, then the first request from the owner node should fail with error (e.g., try again later), wherein in effect the data/parity update also holds a lock on the parity that prevents the rebuild protocol from starting.

Multiple Rebuilds

With the described protocols, it is possible for two or more rebuilds to be running concurrently, even in the same stripe. It is not required that the parity lock node be the same for each of the concurrent rebuilds. The lock at a parity lock node is of type reader-writer and thus allows multiple readers but no writers. As such, multiple owner nodes can request this lock as a shared lock. It is released after all the requesting owner nodes have completed their protocol.

The advantage to the "@home" rebuild variation in the presence of multiple failures is the distribution of work amongst multiple nodes. However, generally, there is a large intersection amongst the recovery strip sets for different owner nodes. This means that multiple copies of some recovery strips will be transmitted over the network to each of the requesting owner nodes. On the other hand, the "delegate" rebuild protocol variation provides a means to minimize this effect. Specifically, the "delegate" version enables a parity lock node to be shared by two or more owner nodes. The shared parity lock node can gather the union of the recovery strip sets for each of the requesting owner nodes into one location. This union is usually not much more than each individual recovery strip set (because of the large intersection between the sets). Consequently, only one copy of each recovery strip is sent over the network and gathered in one place. Then, the computation is focused at the parity lock and the results of the computations returned to each requesting owner node.

On the other hand, the "delegate" rebuild protocol is not always the most efficient; there are cases of single rebuild where the "@home" variation is more resource efficient. Consequently, the "@home" protocol is generally the optimum choice for single rebuild and the "delegate" protocol for multiple rebuilds (recovering data or parity lost from multiple drive or node failures).

Another optimization is based on the fact that an owner node may or may not know if it is the only rebuild that is required. If the owner node is aware that more than one rebuild is required, it can invoke the delegate version immediately. If not, it may determine this fact during the "@home" protocol. For example, it might determine that two rebuilds are needed when a request for a recovery strip from some node fails (this other strip must also then be a strip requiring recovery). It can abort the "@home" variation (by sending the unlock request to the parity lock node) and fall back on a "delegate" protocol.

Employing a rebuild protocol described herein, such as an owner-driven "@home" rebuild protocol, involves an owner node that assumes responsibility for a lost data or parity strip, initiates a rebuild protocol on a distributed redundancy storage system, involving a process comprising:
 a. a selection of a recovery strip set and a parity lock node.
 b. three phases—lock phase, gather plus compute phase, and unlock phase.
 c. optional read request in the lock request step.
 d. in the gather plus compute step, recovery strips are collected at the owner node which then re-computes the lost data and/or parity from the gathered recovery strips.

Employing a owner-driven delegate rebuild protocol, an owner node that assumes responsibility for a lost data or parity strip, initiates a rebuild protocol on a distributed redundancy storage system, involving process comprising:
 a. a selection of a recovery strip set and a delegate node.
 b. three phases—lock phase, gather plus compute phase, and unlock phase.
 c. in the gather step, recovery strips are collected at the delegate node; the delegate node re-computes the lost data or parity from the gathered recovery strips and sends the recovered data and/or parity to the requesting owner node.

Two example implementations of the rebuild protocol for are described below for RAID6 and Weaver erasure codes.

RAID6

Figure 4:
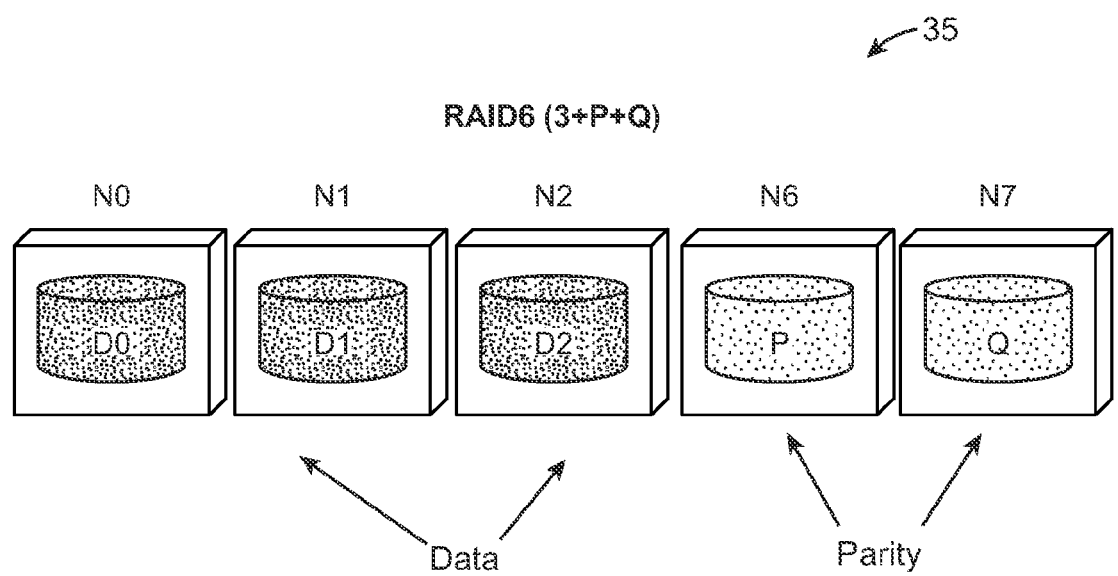
FIG. 4 shows an example embodiment of data parity layout for a distributed data storage system implementing a RAID6 erasure code to which the rebuild protocol is applicable.

FIG. 4 shows an example distributed redundancy data storage system 35, illustrating data and parity relations for the RAID6 erasure code on three data nodes (N0, N1, N2) and two parity nodes (N3, N4) with fault tolerance two. RAID6 provides a storage system with a striped set and dual distributed parity with fault tolerance from two disk drive failures (the storage system can continue operation when one or two disk drives fail).

FIG. 4 shows three data strips (D0, D1, D2), wherein according to the invention, a P parity is computed with a mathematical formula (e.g., exclusive OR) of the six data strips D0 through D2. Further, a Q parity is computed by a different mathematical formula (e.g., Reed-Solomon encoding). Other mathematical formulas may also be used. In this erasure code each node owns only one strip: there are three data owner nodes and two parity owner nodes (no node owns both a data and a parity strip from the same stripe). For each data owner node, a typical embodiment selects node N3 (the owner of the P parity strip) as the parity lock node (if N3 has failed, then N4 can assume this role). Node N3 is its own parity lock node if the P parity on N3 is to be rebuilt. If the Q parity strip is lost (on N4), then either N4 can be its own parity lock node or N3 can play this role. The description can easily be extended to wider strips (with more data strips) or to higher fault tolerance.

The recovery strips for each data and parity strip depends on the extent of the failures. For the one only failure scenario, there are three cases. For a single data strip such as D0, the recovery strips are the other data strips D1 and D2 plus P. If P or Q is lost, then the recovery strips are the data strips D0, D1 and D2 (in either case). For two failures, there is only one recovery strip set, namely, all the remaining strips (whether data or parity).

Figure 5A:
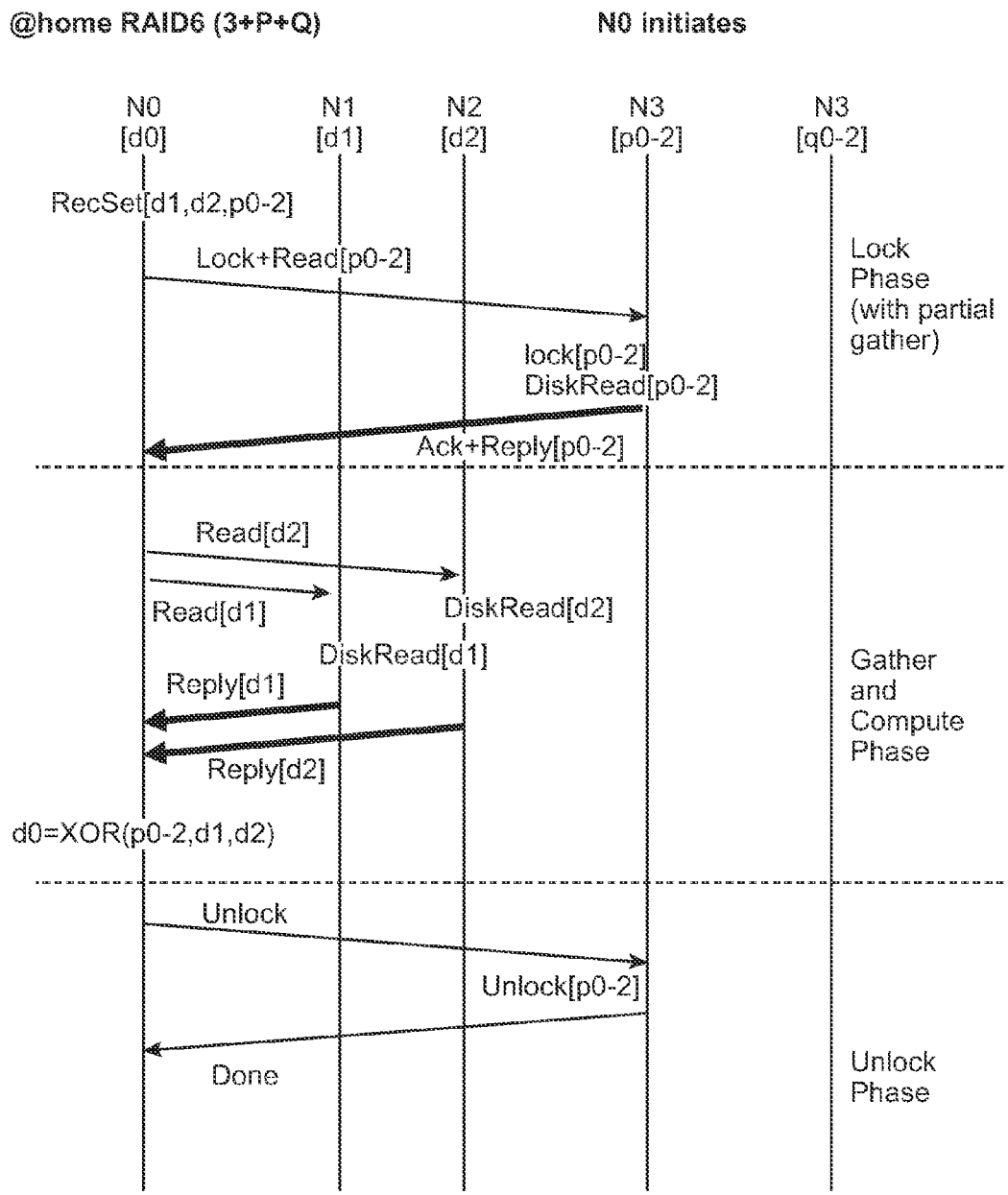
FIG. 5A shows an example event sequence in a rebuild protocol process in a distributed redundancy RAID6 erasure code data storage system.

FIG. 5A shows an event sequence diagram (top to bottom) 40 for an example of said "@home" rebuild protocol on RAID6 where a node, such as N0 is rebuilding data d0, implemented by the system 35. Node N0, as owner of d0, initiates the "@home" protocol. In this diagram, each vertical line represents a node in the storage system that owns data or parity in a RAID6 stripe with 3 data strips and parities P and Q (so RAID6(3+P+Q)). Other nodes in the storage system not related to this stripe are not represented. The vertical bars labeled N0,N1, and N2 are nodes that each hold one of the three data strips in the stripe; the vertical bars labeled N3 and N4, respectively, are nodes that hold the P parity value and Q parity value for the stripe, respectively. Below these labels are one symbol expressions.

The expression [d0] represents the parity integrated version of the data for strip 0 stored on node N0. Similarly, [d1] and [d2], [p0-2], and [q0-2] represent the parity integrated versions of the data strips d1 and d2 and the P parity strip p0-2 (computed from the parity integrated data d0,d1,d2) and the Q parity stripe q0-2 (also computed from the parity integrated data d0,d1,d2). The dotted horizontal lines separate the three phases of the protocol, as labeled on the right side of the diagram. Arrows between vertical lines represent communication messages between nodes, with the message originating at the node at the tail of the arrow and sent to the node at the head of the arrow. Thin arrows represent small control messages; thick arrows represent messages that include bulk payload of data and/or parity. Time is represented downward in the diagram. The relative size of the time gaps does not necessarily represent time to scale; it represents only relative ordering in time.

In the first phase, the data owner node N0 determines a recovery set ("RecSet[d1,d2, p0-2]"). This recovery set contains one parity value p0-2, thus node N3, owner of p0-2 is designated as the parity lock node. Node N0 sends a combined Lock+Read[p0-2] message to node N3. On receipt, node N3, the parity lock node, locks its parity ("lock[p0-2]") from update, and performs a read operation to access its copy of p0-2 ("DiskRead[p0-2]"). Node N3 then sends a combined "Ack+Reply[p0-2]" message back to the owner node N0 that confirms the lock has been set and includes the requested parity value p0-2. This completes the lock phase (and partial gather). On receipt, the owner node N0 begins the second phase. It sends read messages ("Read[d1]" and "Read[d2]") to nodes N1 and N2, respectively, for the other two strips in the recovery set. Each of these nodes performs a read to obtain a copy of the strip they own ("DiskRead[d1]" and "DiskRead [d2]" on nodes N1 and N2, respectively).

Each of nodes N1 and N2 send the requested recovery data strips back to owner node N0 with a bulk reply message ("Reply[d1]" and "Reply[d2]", from N1 and N2, respectively). On receipt, owner node N0 re-computes the lost value of data strip d0 as the XOR of the strips in the recovery set (other erasure codes or recovery sets may use a different mathematical formula for the re-computation step). This completes the gather and compute phase. Finally, owner node N0 sends an unlock message ("Unlock") to parity lock node N3. On receipt, N3 unlocks its parity ("unlock[p0-2]") and sends a response back to owner node N0 ("Done") indicating that the unlock was completed. This completes the unlock phase of the protocol and completes the rebuild of lost d0.

Figure 5B:
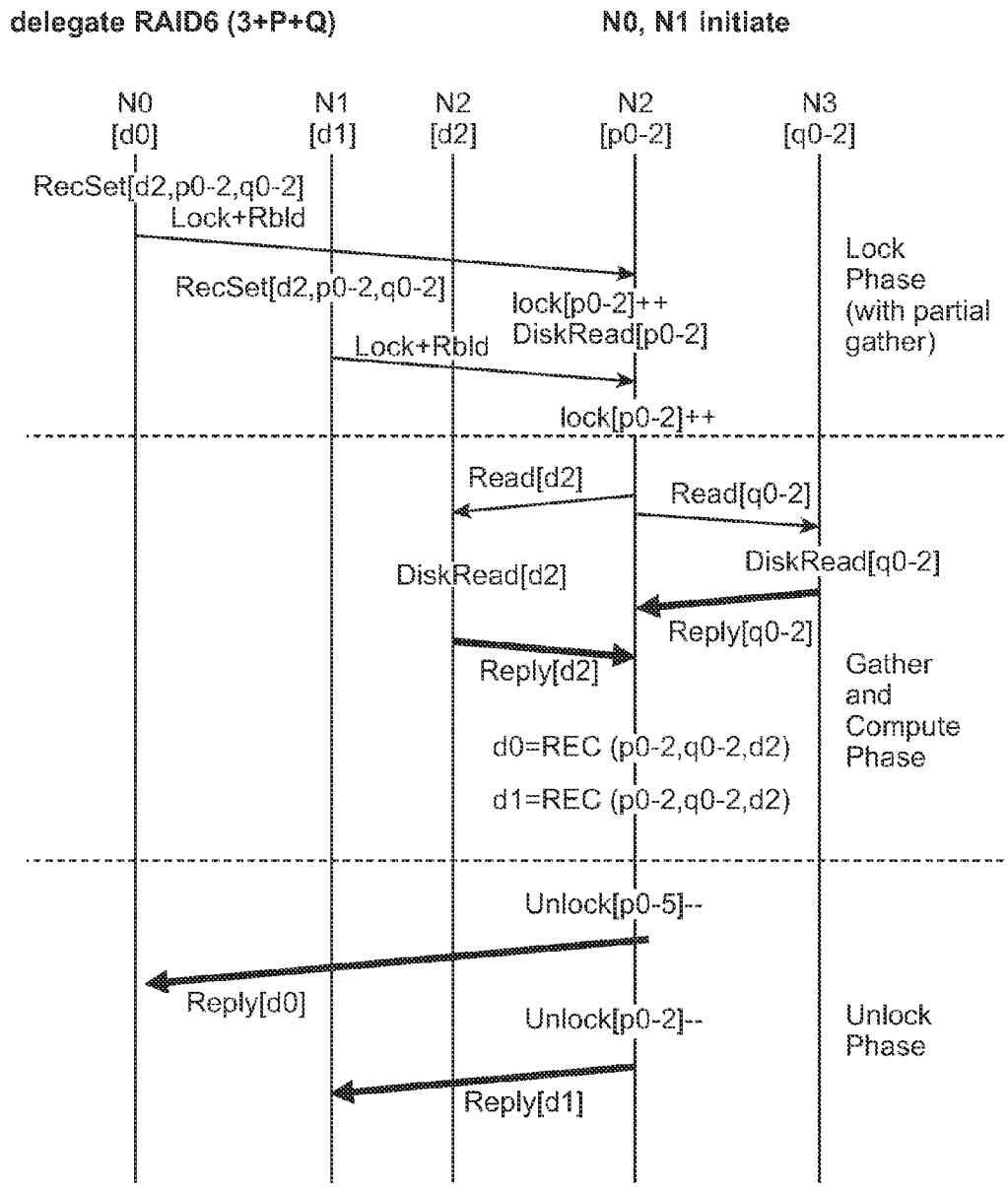
FIG. 5B shows an example event sequence in another rebuild protocol process in a distributed redundancy RAID6 erasure code data storage system.

FIG. 5B shows an event sequence diagram 45 for an example of said delegate rebuild protocol on RAID6 when both nodes, N0 and N1 need to be rebuilt, implemented by the system 35. As in FIG. 5A, each vertical line represents a node in the storage system that owns data or parity in a RAID6 stripe with 3 data strips and parities P and Q (so RAID6(3+P+Q)). Other common elements between FIGS. 5A and 5B are as described above.

In the first phase, both nodes, N0 and N1 initiate the protocol independently (in fact, each phase of N0 and N1's protocol may overlap in different combinations, though that is not depicted in this diagram). The order of Lock+Rbld request from N1 to parity node N3 can occur at any time, independent of the start of N0's rebuild protocol. Further, node N3 may compute d1 prior to the Lock+Rbld request from N1. Each of N0 and N1 determine recovery sets for each of their lost data ("RecSet[d2,p0-2,q0-2]" for each of N0 and N1). The recovery set for N0 differs from that in FIG. 5A if N0 is aware that N1 is lost and so d1 is not available.

Alternatively, node N3 can determine a more appropriate recovery set in its role as delegate. In this delegate version, both N0 and N1 select N3 (owner of p0-2) as the delegate and parity lock node. Consequently, each sends, independently, a lock and (delegate) rebuild request ("Lock+Rbld") message to node N3. On receipt of the first such message (from N0 in the diagram, but more generally from either N0 or N1), node N3 increments the read-write lock on its parity ("lock[p0-2]++") thereby preventing it from being updated. Node N3 then reads its parity value p0-2 from disk ("DiskRead[p0-2]") as partial "gather". On receipt of the second lock and rebuild request from N1, node N3 increments is read-write lock on its parity ("lock[p0-2]++"). This completes the overlapped lock phase for both N0 and N1. Note that N3 may not know that N1's lock and rebuild request is coming, so it may initiate the gather phase for N0 after or in parallel with the local disk read (this may happen before or after N1's lock and rebuild request). As the delegate node, N3 sends read requests ("Read [d2]" and "Read[q0-2]") to each of the owner nodes (N2 and N4) for the other strips (d2 and q0-2) in the union of the two recovery sets (in this example, the two sets are the same and there are only two read requests required).

Each of the other nodes reads the requested data or parity, typically from disk, ("DiskRead[d2]" on N2 and "DiskRead [q0-2]" on N4), and sends a bulk reply message back to node N3 ("Reply[d2]" and "Reply[q0-2]"). On receipt of these data and parity strips, node N3 computes the missing data for each of N0 and N1 ("d0=REC(p0-2,q0-2,d2)" and "d1=REC(p0-2,q0-2,d2)", where the expression REC indicates the mathematical formula needed to compute the left hand side of the equation (it is different for each of d0 and d1)). This completes the gather and compute phase.

In the final unlock phase, node N3 decrements its parity lock (the first "unlock[p0-2]--") on behalf of the lock for data owner N0 and sends the bulk reply message ("Reply[d0]") back to N0 with the recovered data d0 as payload. This completes the rebuild protocol for N0. Finally, N3 decrements its parity lock (the second "unlock[p0-2]--") on behalf of data owner N1 and sends the bulk reply message ("Reply[d1]") back to N1 with the recovered data d1. This completes the rebuild protocol for N1. At this point, the lock on p0-2 at N3 is zero (that is, all locks are released) and the protocol for both rebuilds are complete at all nodes.

Weaver

Figure 6:
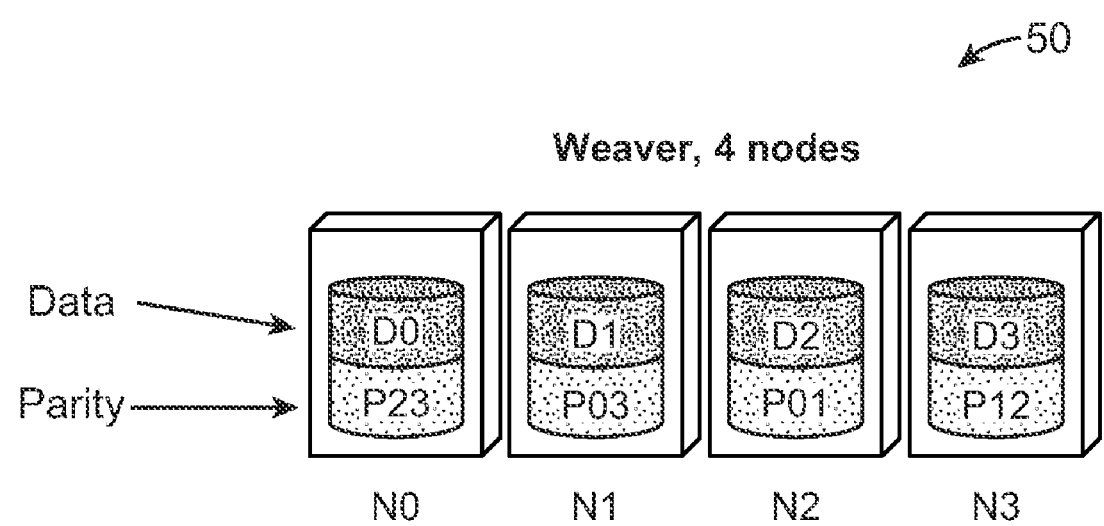
FIG. 6 shows an example embodiment of data parity layout for a distributed data storage system implementing a Weaver erasure code to which the rebuild protocol is applicable.

FIG. 6 shows an example distributed redundancy data storage system 50, illustrating data stripes D0 through D3 and parity (P23, P03, P01, P12) for the Weaver code on four nodes (N0, N1, N2, N3), with fault tolerance two. The design features of Weaver codes include: (a) placement of data and parity blocks on the same strip, (b) constrained parity in-degree, and (c) balance and symmetry. These codes are in general not maximum distance separable (MDS) but have optimal storage efficiency among all codes with constrained parity in-degree. Weaver codes are described in James Lee Hafner, "WEAVER Codes: Highly Fault Tolerant Erasure Codes for Storage Systems," published at http://www.usenix.org/events/fast05/tech/full_papers/hafner_weaver/hafner_weaver.pdf, December 2005.

In FIG. 6, each node is a data owner node and each node is also a parity owner node for parity in the same stripe.

For one node (or disk) loss, there are two recovery strip set options, however one of the two options minimize resource utilization. For example, if N0 is lost, the optimum recovery strip set is D3, P03, and D2 (one strip from each of the other nodes). The other recovery set is P01, D1, D2, and D3 for a total of four strips). The other cases are determined by symmetry. In the discussion below, only the first recovery set is used when only one node has failed. In this case, the parity lock node is the node containing P03.

If two nodes are lost, then the remaining four strips (two from each surviving node) form the common recovery set for both lost nodes. Either remaining node can be defined as the parity lock node (they both hold a parity strip in the recovery strip set). A remaining node with lowest data strip label is selected by convention so that both rebuilding nodes will use the same parity lock node. This is also the preferred choice for the delegate node in the delegate version of the protocol.

Figure 7A:
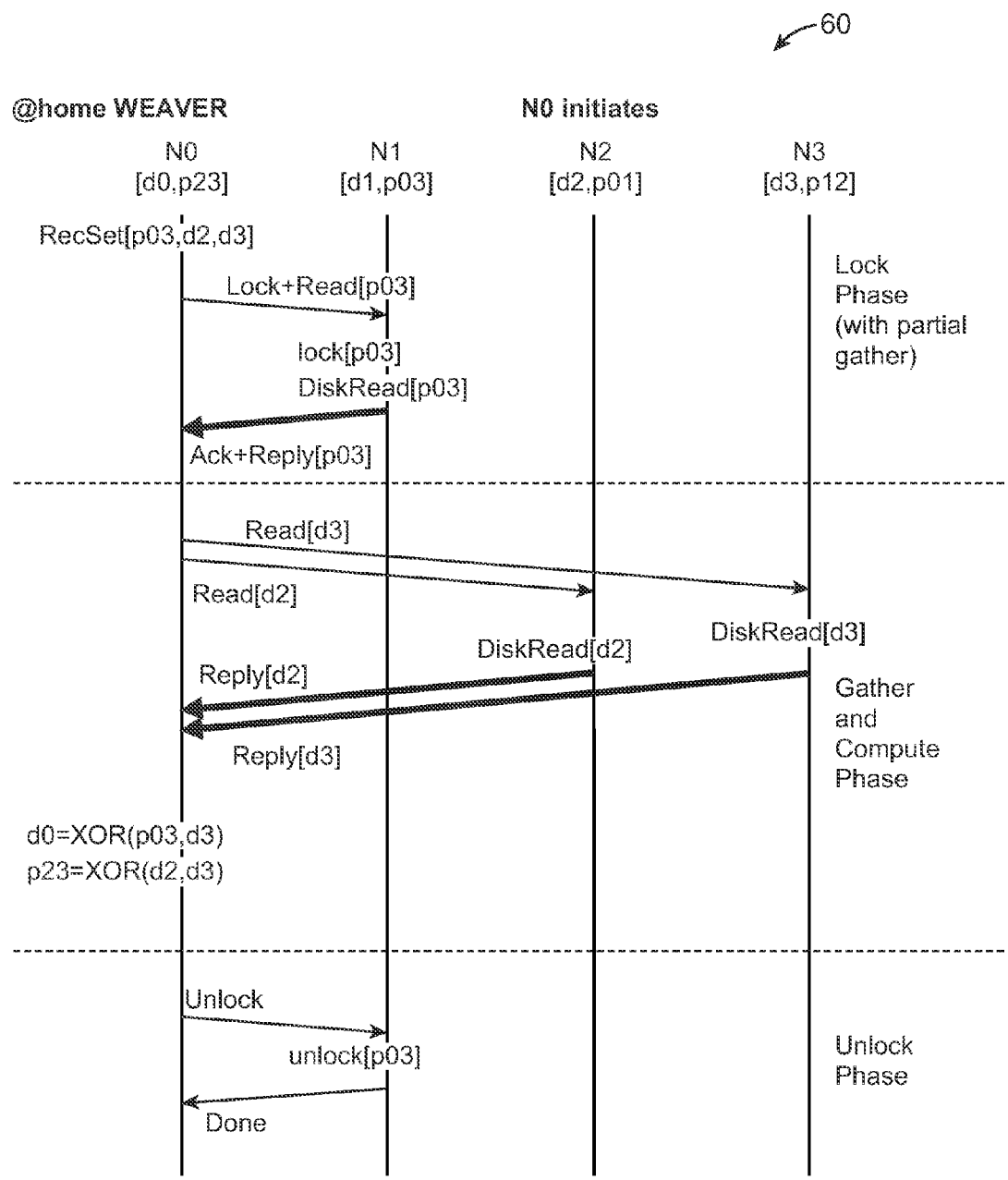
FIG. 7A shows an example event sequence in a rebuild protocol process in a distributed redundancy Weaver erasure code data storage system.

FIG. 7A shows an event sequence 60 (top to bottom) for the rebuild protocol implemented by system 50 of FIG. 6, according to an embodiment of the invention, wherein node N0 initiates the "@home" rebuild protocol version. In FIG. 7A, each vertical line represents a node in the storage system that owns data and parity in a Weaver stripe with 4 data strips d0, d1, d2, d3, and 4 parities strips p23, p03, p01, p12. Node N0 owns both d0 and p23, node N1 owns both d1 and p03, node N2 owns both d2 and p01 and node N3 owns both d3 and p12. These owning relationships are indicated by the bracketed expression below each node name (e.g., "[d0, p23]" below the label "N0"). Because N0 owns both a data and a parity, the rebuild protocol most likely needs to rebuild both the data strip d0 and the parity strip p23. Other common elements between FIGS. 5A and 7A are as described above.

In the first phase, the data/parity owner node N0 determines a recovery set ("RecSet[p03,d2, d3]"). This recovery set contains one parity value p03, thus node N1, the owner of p03 is designated as the parity lock node. Node N0 sends a combined Lock+Read[p03] message to node N1. On receipt, node N1, the parity lock node, locks its parity ("lock[p03]") from update, and performs a read operation to access its copy of p03 ("DiskRead[p03]"). Node N1 then sends a combined "Ack+Reply[p03]" message back to the owner node N0 that confirms the lock has been set and includes the requested parity value p03. This completes the lock phase (and partial gather). On receipt, the owner node N0 begins the second phase. It sends read messages ("Read[d2]" and "Read[d3]") to nodes N2 and N3, respectively, for the other two strips in the recovery set. Each of these nodes performs a read to obtain a copy of the strip they own ("DiskRead[d2]" and "DiskRead [d3]" on nodes N2 and N3, respectively). Each of nodes N2 and N3 send the requested recovery data strips back to owner node N0 with a bulk reply message ("Reply[d2]" and "Reply [d3]", from N2 and N3, respectively). On receipt, owner node N0 re-computes the lost value of data strip d0 ("d0=XOR (p03,d3)") and also re-computes the lost parity strip p23 ("p23=XOR(d2,d3)"). This completes the gather and compute phase.

Finally, owner node N0 sends an unlock message ("Unlock") to parity lock node N1. On receipt, N1 unlocks its parity ("unlock[p03]") and sends a response back to owner node N0 ("Done") indicating that the unlock was completed.

This completes the unlock phase of the protocol and completes the rebuild of lost d0 and p23.

Figure 7B:
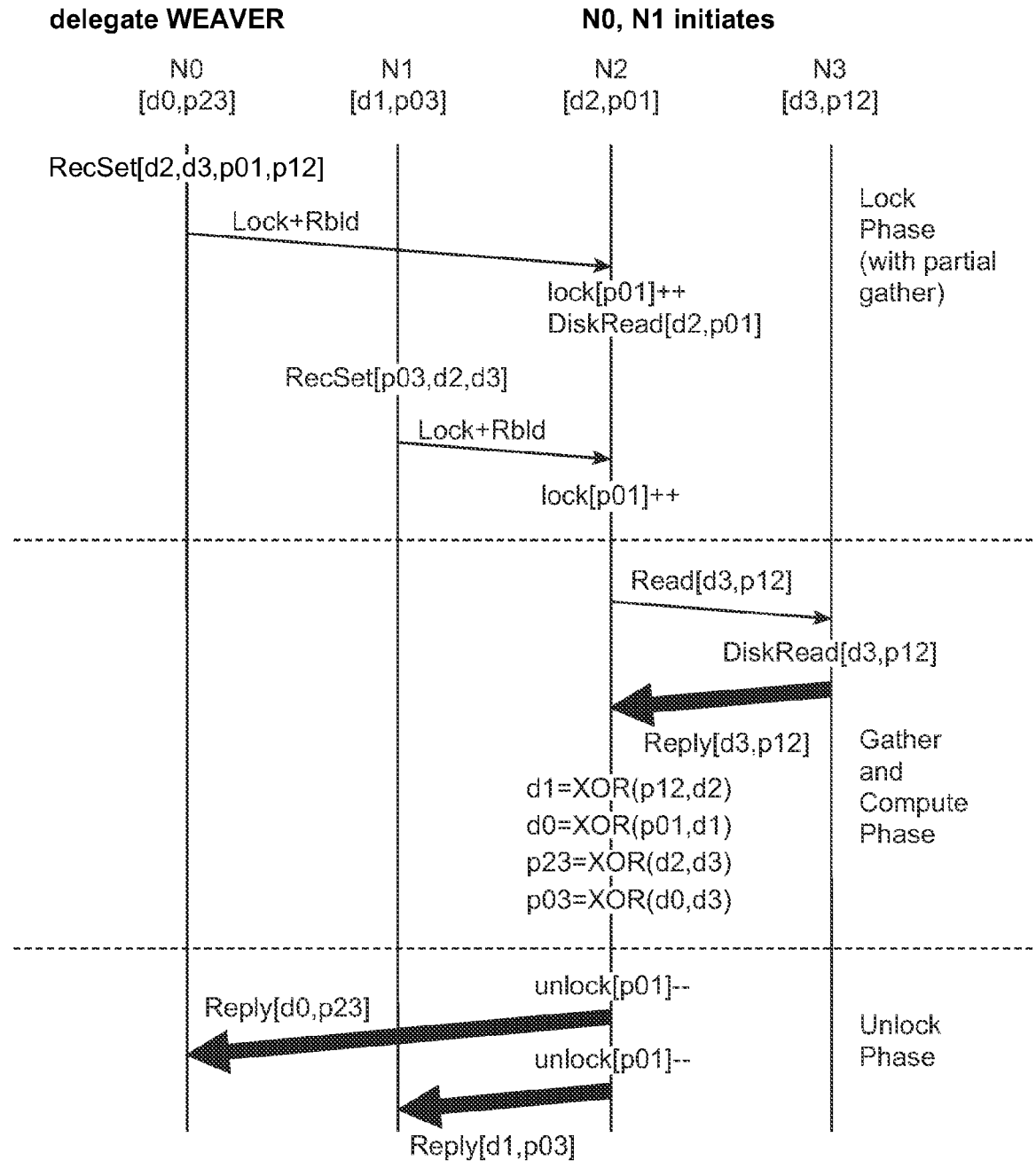
FIG. 7B shows an example event sequence in a rebuild protocol process in a distributed redundancy Weaver erasure code data storage system.

FIG. 7B shows an event sequence 65 (top to bottom) for the rebuild protocol implemented by system 50 of FIG. 6, according to an embodiment of the invention, wherein both node N0 and N1 need to rebuild, and each independently of each other initiates a "delegate" version rebuild protocol. As in FIG. 5B, the order of Lock+Rbld request from N0 or N1 to N2 can occur at any time, independent of N0's rebuild protocol. N2 may even compute d1 and p03 prior to the Lock+Rbld request from N1. As in FIG. 7A, each node owns both a data strip and a parity strip and both N0 and N1 need both rebuilt (as such a total of 4 strips need to be recovered by delegate node N2). As in FIG. 5B, the phases of the delegate rebuild protocol for each of N0 and N1 may overlap in many different ways, not indicated in this example diagram. Other common elements between FIGS. 5A, 5B and 7A are as described above.

In the first phase, both nodes, N0 and N1 initiate the protocol independently. Each of N0 and N1 determine recovery sets for each of their lost data ("RecSet[d2,d3,p01,p12]" for each of N0 and N1). The recovery set for N0 differs from that in FIG. 5A if N0 is aware that N1 is lost and so d1 is not available. Alternatively, node N2 can determine a more appropriate recovery set. In this delegate version, both N0 and N1 select N2 (owner of p01) as the delegate and parity lock node. Consequently, each sends, independently, a lock and (delegate) rebuild request ("Lock+Rbld") message to node N2. On receipt of the first such message (from N0 in the diagram, but more generally from either N0 or N1), node N2 increments the read-write lock on its parity ("lock[p01]++") thereby preventing it from being updated. Node N2 then reads both its data value d2 and parity value p01 from disk ("DiskRead[d2,p01]") as partial "gather". On receipt of the second lock and rebuild request from N1, node N2 increments is read-write lock on its parity ("lock[p01]++"). This completes the overlapped lock phase for both N0 and N1. Note that N2 may not know that N1's lock and rebuild request is coming, so it may initiate the gather phase for N0 after or in parallel with the local disk read; this may happen before or after N1's lock and rebuild request. As the delegate node, N2 sends a (single in this example) read request ("Read[d3,p12]") to node N3, the owner of the data and parity from the recovery set not yet available on node N2. Node N3 (in general, each requested node) reads the requested data and parity, typically from disk, ("DiskRead[d3,p12]"), and sends a bulk reply message back to node N2 ("Reply[d3,p12]"). On receipt of these data and parity strips, node N2 computes the missing data and parity for each of N0 and N1 ("d1=XOR(p12,d2)", "d0=XOR(p01,d1)", "p23=XOR(d2,d3)", and "p03=XOR(d0,d3)"). This completes the gather and compute phase.

In the final unlock phase, node N2 decrements its parity lock (the first "unlock[p0-2]--") on behalf of the lock for owner N0 and sends the bulk reply message ("Reply[d0, p23]") back to N0 with the recovered data d0 and recovered parity p23 as payload. This completes the rebuild protocol for N0. Finally, N2 decrements its parity lock (the second "unlock[p0-2]--") on behalf of owner N1 and sends the bulk reply message ("Reply[d1,p03]") back to N1 with the recovered data d1 and recovered parity p03. This completes the rebuild protocol for N1. At this point, the lock on p01 at N2 is zero (that is, all locks are released) and the protocol for both rebuilds are complete at all nodes.

As such, the invention provides an owner-driven rebuild protocol for reconstructing date on a distributed redundancy data storage system wherein each node that needs to rebuild a data or parity strip in a stripe can initiate the rebuild protocol independently of any other node that may need rebuilding.

Multiple rebuilds can be running concurrently within the same stripe. Usage of reader-writer locks are sufficient to maintain correctness of the recovered data or parity. Each rebuild protocol needs only establish a single lock at one node in order to guarantee correctness. In the presence of a failure during the protocol, locks are released either explicitly or implicitly. Certain failures may result in unavoidable data loss which is not a correctness issue. Other failures cause a restart of the rebuild protocol with a different recovery strip set (that is, a different participant node set). The two example rebuild variations ("@home" and "delegate") allow for optimum resource utilization, depending on the failure scenario. The rebuild protocol does not require any single stripe-wide central point of coordination (though certain failure cases may focus "delegate" to a single point or may focus the "@home" locks at a single point, this is a derived behavior, not a specification of the protocol).

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Generally, the term "computer-readable medium", as used herein, refers to any medium that participated in providing instructions to a processor for execution. Such a medium may take many forms, including but not limited to, non-volatile media, volatile media and transmission media. Non-volatile media includes, for example, optical or magnetic disks. Volatile media includes dynamic memory. Transmission media includes coaxial cables, copper wire and fiber optics, including the wires that comprise a bus. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of recovering data in a distributed redundancy data storage system including multiple nodes, comprising:
    storing information as a set of stripes, each stripe including a collection of data strips and associated parity strips, the set of stripes distributed across corresponding owner nodes and corresponding parity owner nodes;
    each owner node for each data strip maintaining the data strip holding a first copy of data, and each parity node maintaining a parity strip holding a parity for the collection of data strips, wherein parity coherency is maintained;
    upon detecting a failure condition, an owner node or a parity owner node:
        determines a recovery strip set including at least one of a data strip or a parity strip;
        selects a parity node; and
    initiates a rebuilding protocol for recovery of lost information; and
    in a gather phase:
    the selected parity node sending request messages to other nodes for the recovery strips it does not hold, the selected parity node reading from local store of the parity strip it holds.

2. The method of claim 1 further comprising:
    in a lock phase:
    an owner node sending a lock request message to the selected parity node, wherein the request includes a read request for a parity strip value; and
    the selected parity node locking its parity from update by other update protocols and sending an acknowledgement message back to the owner node with a parity payload, if requested.

3. The method of claim 2 further comprising:
    in a gather phase:
        on receipt of the lock request acknowledgement, the owner node sending read request messages to other nodes for their strips in the recovery strip set; and
        upon all the recovery strips being received at the owner node, the owner node re-computing its lost data or parity.

4. The method of claim 3 further comprising:
    in an unlock phase:
        the owner node sending an unlock message to the selected parity node; and
        the selected parity node unlocking the parity from update and replying with an unlock acknowledgement message.

5. The method of claim 2, wherein:
    when the owner node comprises a data owner, the selected parity node is the owner of a parity strip in the recovery strip set; and
    when the owner node comprises a parity owner, the selected parity node is the owner node itself such that in the lock phase the lock request message is implicit.

6. The method of claim 1 further comprising:
    in a lock phase:
        the owner node sending a rebuild and lock request to the selected parity node in forwarding message sequence order; and the selected parity node locking its parity from update by other update protocols.

7. The method of claim 6, wherein
when all the recovery strips are received at the selected parity node, the selected parity node as a delegate node re-computing the lost data or parity on behalf of the owner node.

8. The method of claim 7 further comprising:
in an unlock phase:
the selected parity node sending rebuilt data or parity to the owner node and unlocking the parity from update; and
the selected parity node replying with an acknowledgement message.

9. The method of claim 1, further comprising:
calculating each parity based on a different parity calculation formula.

10. A distributed data storage system for maintaining data storage reliability, comprising:
multiple nodes configured for storing information as a set of stripes, each stripe including a collection of data strips and associated parity strips, the set of stripes distributed across corresponding data owner nodes and corresponding parity owner nodes, each data owner node for each data strip configured for maintaining the data strip holding a first copy of data, and each parity node configured for maintaining a parity strip holding a parity for the collection of data strips, wherein parity coherency is maintained;
upon detecting a failure condition, a data owner node or parity owner node:
determines a recovery strip set containing its parity strip, for a requesting owner node;
selects a parity node; and
initiates a rebuilding protocol for recovery of lost information; and
in a gather phase:
the selected parity node sends request messages to other nodes for the recovery strips it does not hold, the selected parity node reads from local store of the parity strip it holds.

11. The system of claim 10, wherein:
in a lock phase:
an owner node sends a lock request message to the selected parity node, wherein the request includes a read request for a parity strip value; and
the selected parity node locks its parity from update by other update protocols and sends an acknowledgement message back to the owner node with a parity payload, if requested.

12. The system of claim 11, wherein:
in a gather phase:
on receipt of the lock request acknowledgement, the owner node sends read request messages to other nodes for their strips in the recovery strip set; and
upon all the recovery strips being received at the owner node, the owner node re-computes its lost data or parity.

13. The system of claim 12, wherein:
in an unlock phase:
the owner node sends an unlock message to the selected parity node; and
the selected parity node unlocks the parity from update and replies with an unlock acknowledgement message.

14. The system of claim 11, wherein:
when the owner node comprises a data owner, the selected parity node is the owner of a parity strip in the recovery strip set; and
when the owner node comprises a parity owner, the selected parity node is the owner node itself such that in the lock phase the lock request message is implicit.

15. The system of claim 10, wherein:
in a lock phase:
an owner node sends a rebuild and lock request to the selected parity node in forwarding message sequence order;
the selected parity node locks its parity from update by other update protocols;
in the gather phase:
when all the recovery strips are received at the selected parity node, the selected parity node as a delegate node re-computes the lost data or parity on behalf of the owner node; and
in an unlock phase:
the selected parity node sends rebuilt data or parity to the owner node and unlocking the parity from update; and
the selected parity node replies with an acknowledgement message.

16. The system of claim 10, wherein each parity calculated based on a different parity calculation formula.

17. A computer program product for recovering data in a distributed redundancy data storage system including multiple nodes, the computer program product comprising:
a non-transitory computer readable medium having a computer usable program code embodied therewith, the computer usable program code comprising:
computer usable program code configured to store information as a set of stripes, each stripe including a collection of data strips and associated parity strips, the set of stripes distributed across corresponding data owner nodes and corresponding parity owner nodes;
computer usable program code configured to maintain a data strip holding a first copy of data, and to maintain a corresponding parity strip holding a parity for the collection of data strips, wherein parity coherency is maintained;
computer usable program code configured to, upon detecting a failure condition, cause a data owner node or a parity owner node to:
select a parity node;
determine a recovery strip set containing its parity strip using the selected parity node, for a requesting owner node; and
initiate a rebuilding protocol for recovery of lost information; and
computer usable program code configured to, in a gather phase:
the selected parity node sends request messages to other nodes for the recovery strips it does not hold, the selected parity node reads from local store of the parity strip it holds.

18. The computer program product of claim 17 further comprising:
computer usable program configured to, in a lock phase, send a lock request message to the selected parity node, wherein the request includes a read request for a parity strip value, wherein the selected parity node locks its parity from update by other update protocols and sends an acknowledgement message back to an owner node with a parity payload, if requested.

19. The computer program product of claim 18 further comprising:
computer usable program configured to, in a gather phase, on receipt of the lock request acknowledgement, send read request messages to other nodes for their strips in the recovery strip set and upon all the recovery strips being received at the owner node, re-compute lost data or parity of the owner node.

20. The computer program product of claim 19 further comprising:
computer usable program configured to, in an unlock phase, send an unlock message to the selected parity node, wherein the selected parity node unlocks the parity from update and replies with an unlock acknowledgement message.

21. The computer program product of claim 18 such that when the owner node comprises a data owner, the selected parity node is the owner of a parity strip in the recovery strip set; and
when the owner node comprises a parity owner, the selected parity node is the owner node itself such that in the lock phase the lock request message is implicit.

22. The computer program product of claim 17 further comprising:
computer usable program configured to, in a lock phase:
send a rebuild and lock request to the selected parity node in forwarding message sequence order, wherein the selected parity node locks its parity from update by other update protocols;
send request messages from the selected parity node to other nodes for the recovery strips it does not hold, such that the selected parity node reads from local store of the parity strip it holds;
when all recovery strips are received at the selected parity node, re-compute the lost data or parity on behalf of an owner node by the selected parity node as a delegate node; and
in an unlock phase:
send rebuilt data or parity from the selected parity node to the owner node and unlock the parity from update; and
reply with an acknowledgement message from the selected parity node.

23. The computer program product of claim 17, further comprising computer usable program configured to calculate each parity based on a different parity calculation formula.

* * * * *